March 15, 1966  W. W. McMULLEN  3,240,506
TRUCK HAVING VERTICALLY MOVABLE TRAILER
Filed July 25, 1962  3 Sheets-Sheet 1

INVENTOR
WAYNE W. McMULLEN
BY
Donald H. Zarley
ATTORNEY

March 15, 1966   W. W. McMULLEN   3,240,506
TRUCK HAVING VERTICALLY MOVABLE TRAILER
Filed July 25, 1962   3 Sheets-Sheet 2
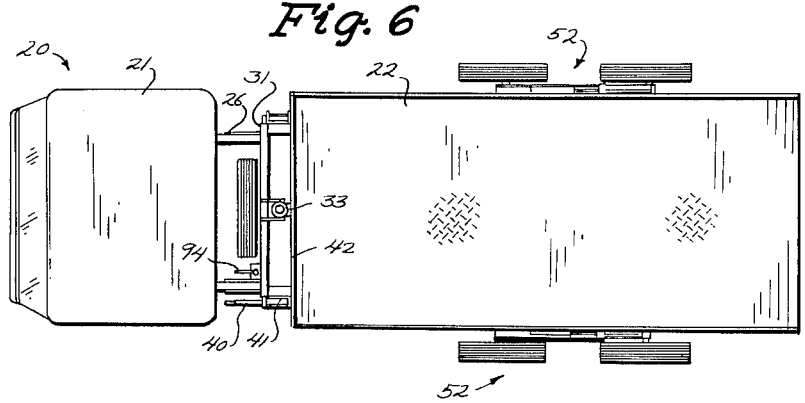
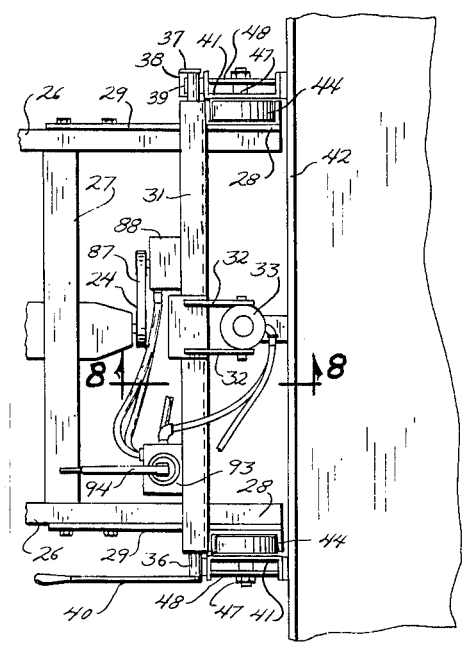
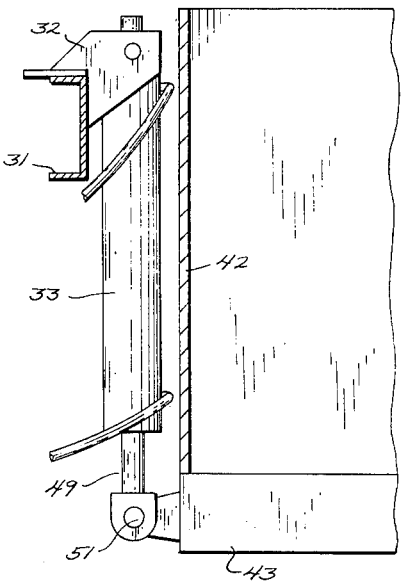
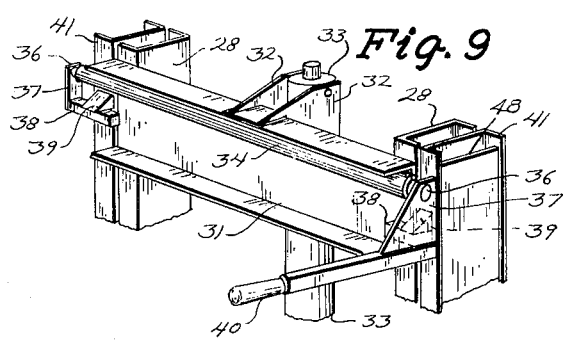
INVENTOR
WAYNE W. McMULLEN
BY
Donald H. Zarley
ATTORNEY

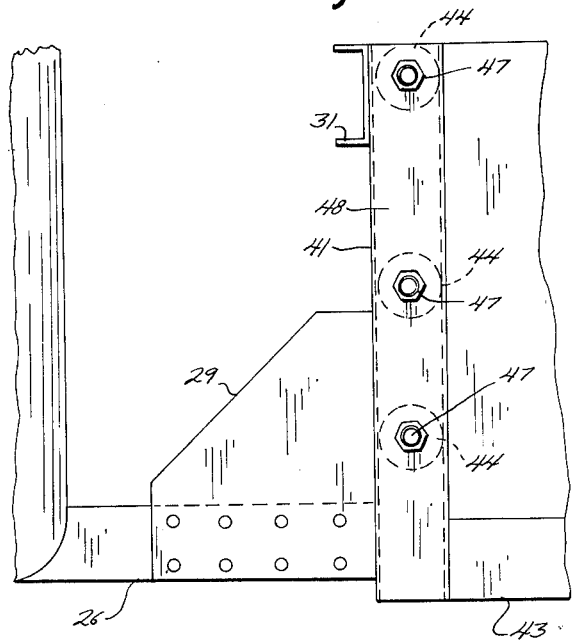
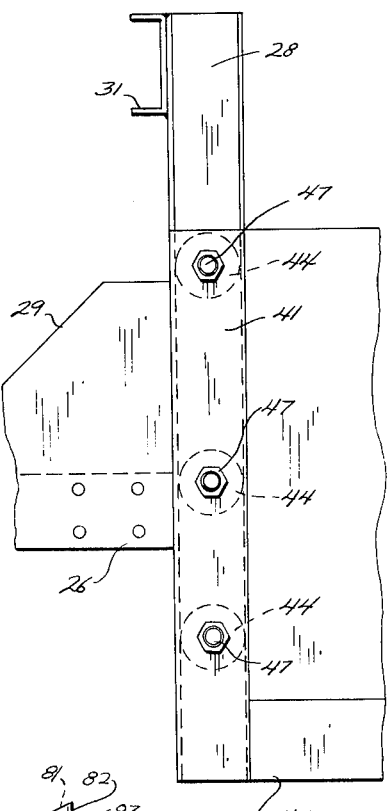
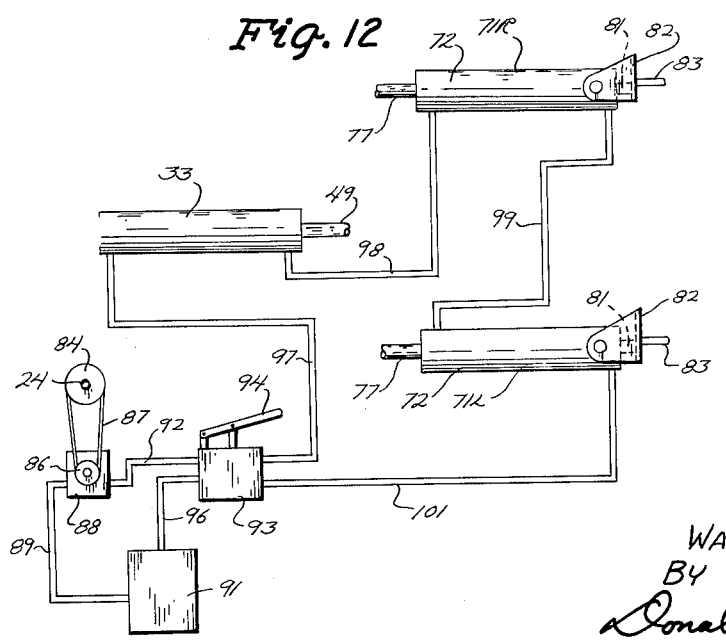
INVENTOR
WAYNE W. McMULLEN

# United States Patent Office 3,240,506
Patented Mar. 15, 1966

3,240,506
TRUCK HAVING VERTICALLY MOVABLE TRAILER
Wayne W. McMullen, 1002 67th St., Des Moines, Iowa
Filed July 25, 1962, Ser. No. 212,337
6 Claims. (Cl. 280—43.23)

My invention relates to trucks for hauling heavy material.

It is an object of this invention to provide an improved truck.

It is another object of this invention to provide an improved truck having a trailer which is movable vertically relative to the truck cab, while remaining in a horizontally disposed position.

Another object of this invention is to provide an improved truck wherein a trailer section is readily movable from a raised transport position to a lowered ground engaging loading position, and then wherein the trailer section is readily movable from the lowered position upwardly to the transport position.

Yet another object of this invention is the provision of such a truck as characterized hereinbefore, wherein the trailer remains perfectly horizontal throughout the entire raising and lowering procedure, and irrespective of the load thereon.

A further object of this invention is to provide a novel combination of articulated linkage means for effecting relative movement of wheels for the trailer operable simultaneously with means for effecting relative movement of the trailer and the cab of the truck.

Another object of this invention is the provision of a truck capable of attaining the above enumerated objectives which is economical of manufacture, durable in use, and effective in service.

These objects, and other features and advantages of this invention will become readily apparent upon reference to the following description, when taken in conjunction with the accompanying drawings, wherein:

FIG. 6 is a top plan view of the truck of FIG. 1;

FIG. 7 is an enlarged fragmentary top plan view, showing in detail the structure between the trailer and the cab of the truck;

FIG. 8 is an enlarged sectional view taken along the line 8—8 of FIG. 7;

FIG. 9 is a fragmentary perspective view of a portion of the structure of FIG. 7;

FIG. 10 is an enlarged view of a detail of the structure between the cab and the trailer of the truck, certain parts being shown in dotted lines for clarity of illustration;

FIG. 11 is a view similar to FIG. 10 but wherein the parts are shown in their loading position; and FIG. 12 is a diagrammatic view of the fluid actuated system for raising and lowering the trailer.

Figure 1:
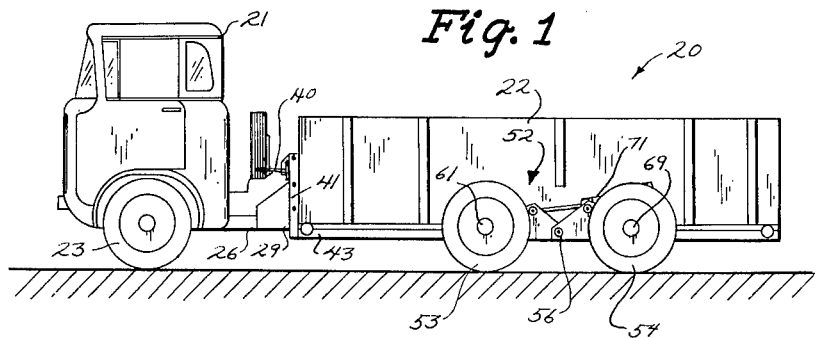
FIG. 1 is a side elevational view of my improved truck showing the truck in its transport position.

Referring now to the drawings, my truck is indicated generally at 20 in FIG. 1 and is comprised of a cab section 21 and a trailer section 22, the latter adapted to move vertically relative to the former.

The cab section 21 is mounted on a pair of wheels 23 and includes a motor (not shown), a transmission (not shown) and the crankshaft 24 (FIG. 7) which extends rearwardly from the cab section 21. Also at the rear thereof, is a pair of frame members 26 interconnected by a transverse member 27. At the rear ends of the frame members 26, is a pair of upright channels 28 (FIG. 7) supported on the frame members 26 by a pair of gusset plates 29.

At the upper end of the channels 28 is mounted a transverse, horizontally disposed channel 31 (FIG. 9), at the center of which a pair of gusset plates 32 support a vertically disposed first hydraulic cylinder assembly 33 (FIGS. 7–9, inc.). An elongated sleeve 34 (FIG. 9) is secured in a horizontal manner to the transverse channel 31 and has rotatably inserted therein a shaft 36 at each end of which is extended an arm 37. One of the arms 37, the right arm as viewed in FIGS. 7 and 9, is rigidly connected at its outer free end to a lever 40. In the normal position of the arms 37, a stop member 38 is extended inwardly therefrom, and beneath a lug 39 secured to the forward side of a vertically disposed channel member 41 (FIG. 9).

The channel members 41 are secured in transversely spaced, parallel manner to the front wall 42 (FIG. 7) of the trailer section 22. The lower ends of the channel members are secured to the front portions of the lower frame 43 for the trailer section 22.

A trio of rollers 44 (FIGS. 7 and 10) are secured in vertically spaced relation to each channel member 41. Each roller being secured by means of a stub shaft 47 inserted through the channel member 41 and secured to an upright plate 48 mounted within the confines of the respective channel member 41. The frame 43 for the trailer section 22 is connected at its front end by a pivot device 51 (FIG. 8) to the piston rod 49 for the first hydraulic cylinder assembly 33. This structure provides, upon actuation of the cylinder assembly 33, whereby the piston rod 49 is extended downwardly therefrom, for a downward movement of the trailer section 22 relative to the cab section 21. And likewise, upon actuation of the cylinder assembly to withdraw the piston rod 49 back into the cylinder thereof, provides for movement of the trailer section 22 vertically upwardly relative to the cab section 21 to a transport position best illustrated in FIG. 1.

Figure 2:
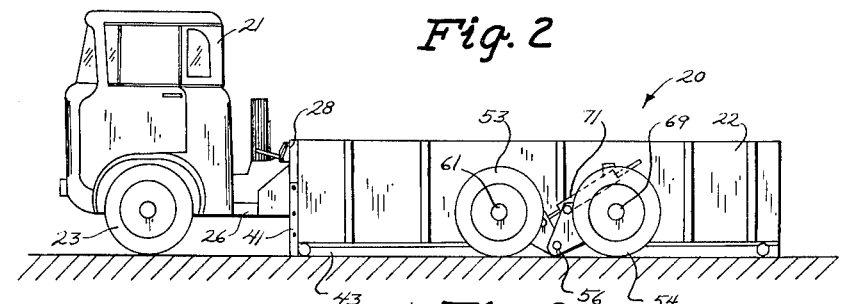
FIG. 2 is a view similar to FIG. 1 and showing the trailer section in a lowered loading position.

To accommodate the vertical movement of the trailer section 22 relative to the cab section 21 (see FIG. 2), the trailer section 22 is provided on each side with a pair 52 (FIG. 6) of relatively movably ground engaging wheels 53 and 54, interconnected by an axle 56 (FIGS. 3–5, inc.) extended transversely through substantially the center of the trailer section frame 43 and connected thereto. As each pair 52 of wheels 53 and 54 is identical to the other, only one will be described. A first pair of triangularly formed plates 57 and 58 (FIGS. 3 and 5) are connected in a parallel, transversely aligned manner at one corner 59 (FIG. 3) thereof to an axle stub shaft 61 for the forward wheel 53. The plates 57 and 58 are connected at an opposite corner 62 (FIG. 3) to the exposed end 63 of the axle 56. Also connected to the axle end 63 at one corner 64 thereof, is another pair of transversely aligned, parallel plates 66 and 67, their opposite corners 68 of which are connected to an axle stub shaft 69 for the rear wheel 54.

Figure 3:
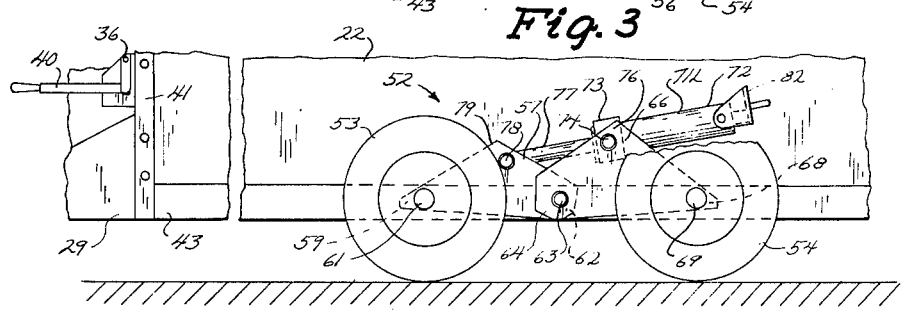
FIG. 3 is an enlarged fragmentary side elevational view particularly of the wheel unit for the trailer, and showing the wheel unit in the transport position.
Figure 4:
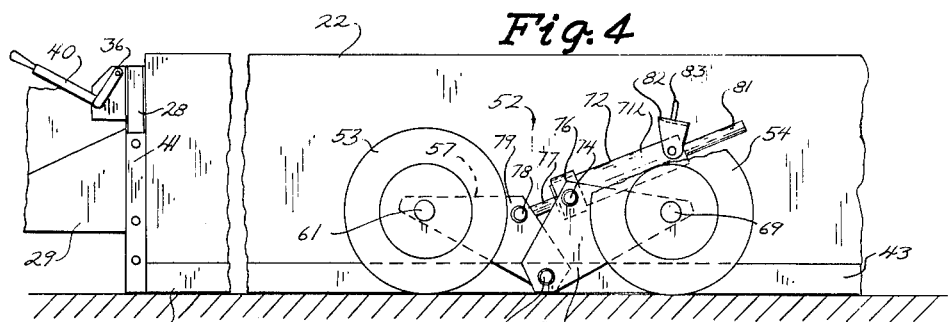
FIG. 4 is a view similar to FIG. 3, but wherein the wheel unit is shown in its lowered loading position.
Figure 5:
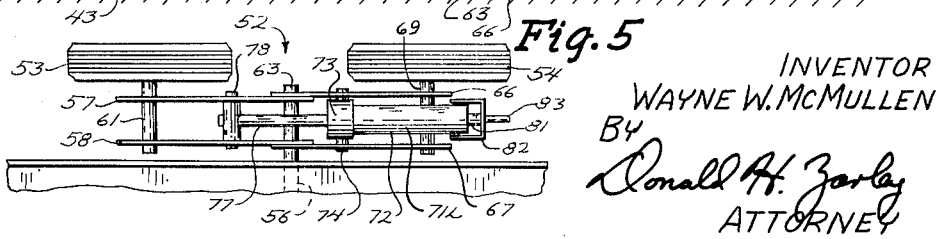
FIG. 5 is a fragmentary top plan view of the wheel unit as shown in FIG. 3.

It may readily be seen, by viewing the structure of the wheel unit 52 in FIGS. 3 and 4, that were the respective pairs of plates 57 and 58, and 66 and 67, not further interconnected, the plates would pivot toward each other as best illustrated in FIG. 4, thereby rolling their respective wheels 53 and 54 toward each other due to the weight of the trailer section 22 upon the axle 56. To provide a means for controlling the relative position of the plates and the wheels 53 and 54 of each wheel unit 52, a second hydraulic cylinder assembly 71 is provided therefor. As designated in FIGS. 3 and 12, the cylinder assembly for the left side of the trailer section 22 is designated 71L, and the right hydraulic cylinder assembly is designated 71R (FIG. 12). Each cylinder assembly is identical, and thus only assembly 71L (FIGS. 3–5, inc.) will be described. This assembly 71L comprises a cylinder 72 pivotally connected at one end 73 to a pivot 74 mounted at the apex corners 76 of the rear plates 66 and 67. The assembly 71L comprises further a piston rod 77 reciprocally movable within the cylinder 72 and pivotally connected at its outer end by a pivot 78 to the apex corners 79 of the forward plates 57 and 58.

Each cylinder 72 is provided with an opening (not shown) at its rear end for the extension therethrough of a rear end 81 of the piston rod 77 when the rod is in the position best illustrated in FIG. 4. To prevent accidental movement of the rods 77, due for example to a hydraulic failure, when the hydraulic cylinder assembly 71L is in the transport poistion of FIG. 3, a U-shaped yoke 82 is pivotally connected to the rear end of the cylinder 72 for movement, by means of a manually operable handle 83, into a position longitudinally aligned with the rod 77. Thus, should a hydraulic failure occur, the rod 77 would be virtually immovable, and an accidental lowering of the trailer section 22 would be avoided.

Referring now to FIG. 12, power for the fluid system depicted therein is provided by the cab section crankshaft 24 which rotates a pair of pulley wheels 84 and 86 via belt 87 for operating a hydraulic pump unit 88. A conduit 89 connects the pump unit 88 to a fluid reservoir 91, and a conduit 92 connected the pump unit 88 to a valve mechanism 93 operated by a handle 94.

The valve mechanism 93 is connected to the reservoir 91 by conduit 96, and to the first hydraulic cylinder assembly 33 by a conduit 97. The conduit 97 is connected to one end of the assembly 33, and another conduit 98 connected at the other end connects the assembly 33 to one end of the second hydraulic cylinder assembly 71R. The other end of the assembly 71R is connected by a conduit 99 to one end of the third hydraulic cylinder assembly 71L, and with the opposite end of the assembly 71L connected by a conduit 101 to the valve mechanism 93. It will readily be seen that by this arrangement, each hydraulic cylinder assembly is double acting, with fluid capable of entering and leaving each cylinder at opposite ends simultaneously.

In one position of the valve mechanism handle 94, fluid is directed under pressure through the conduit 97 to one end of the hydraulic cylinder assembly 33, and sequentially to common ends of the cylinder assemblies 71R and 71L. The system is completed by the fluid from the exit end of the assembly 71L being transmitted through line 101 to the valve mechanism 93.

In a second position of the handle 94, fluid is transmitted in a counterclockwise direction through the system as viewed in FIG. 12, being forced through conduit 101 to the assembly 71L, and then through conduit 99 to a common end of the assembly 71R. Thence through conduit 98 to an opposite end of the first assembly 33, with the system being complete by the conduit 97 leading from the fluid exit end of the assembly 33 to the valve mechanism 93. In a third position of the handle 94, fluid pumped from the pump unit 88 through conduit 92 into the valve mechanism 93 is bypassed therethrough to the reservoir 91. Fluid on the other side of the valve mechanism 93 is held in a static condition, so that all three pistons remain in the position they were in at the time of movement of handle 94 to the third or neutral position. In the operation of the truck, assume the cab section 21 and the trailer section 22 to be in the transport position of FIG. 1, with no load on the trailer section 22, the first hydraulic cylinder assembly 33 (FIG. 8) is in the condition wherein the piston rod 49 is withdrawn within the cylinder thereof, and the two wheel hydraulic assemblies 71R and 71L are in the condition wherein their piston rods 77 are extended within the cylinders 72 (FIG. 3) holding the plate units in their extended positions best illustrated in FIG. 3.

The trailer section 22 is locked against vertical movement relative to the cab section 21 due to the lever 40 being in a position with its arms 37 holding the stop members 38 in a position extended below the lugs 39. Thus, before the hydraulic mechanism can be operated to effect a lowering of the trailer section 22, the lever 40 must be manually operated to a position best shown in FIGS. 2 and 4 wherein the stop members 38 are pivoted from under the lugs 39 enabling the outer channel members 41 to move downwardly relative to the inner cab section channels 28. When this step has been completed, the hydraulic valve mechanism lever 94 is movable to the first position whereby fluid is directed through the conduit 97 in the clockwise path of the hydraulic system as viewed in FIG. 12. Therefore, the cylinder assembly 33 is actuated to extend its piston rod 49 (FIG. 8) thus forcing the trailer section frame 43 downwardly. Simultaneously, the hydraulic assemblies 71R and 71L are actuated to withdraw their piston rods 77.

Referring to FIG. 4, it is seen that as each piston rod 77 is directly connected to the apex corners of the plates 57 and 58, opposite the apex corner connection of the cylinder 72 with the plates 66 and 67, the withdrawal of the piston rod 77 into its cylinder 72 effectuates a pivotal arcuate movement of each pair of plates toward the opposite pair of plates. As each wheel is free to rotate, the wheels 53 and 54 are moved toward each other, permitting thereby the trailer section axle 63 to move downwardly until the trailer section frame 43 rests upon the surface of the ground. It will be noted that by the combination of the action of the wheel cylinders 71L and 71R being simultaneous with the action of the cylinder assembly 33, the trailer section 22 remains horizontally disposed during its downward movement.

When the frame 43 has reached and is resting on the ground, the handle 94 is moved to the neutral position, thus stopping operation of the hydraulic cylinder assemblies and in effect maintaining the frame 43 in the lowered position for loading purposes. After the trailer section 22 has been loaded, the valve mechanism handle 94 is moved to the second position thereof to transmit fluid in a reverse flow, as compared to the flow through the fluid system for the lowering operation, to effectuate a reverse movement of the piston rods.

Thus, the hydraulic cylinder assembly 33 is actuated to lift its piston rod 49 (FIG. 8) whereby the trailer section frame 43 is lifted upwardly. As viewed in FIGS. 10 and 11, upward movement of the trailer frame 43 causes movement of the trailer channel members 41 upwardly by means of the rollers 44 operating within the cab section channels 28. Simultaneously, the hydraulic cylinder assemblies 71R and 71L are actuated to extend the piston rods 77 outwardly of their cylinders 72. This action results in the pairs of plates 57 and 58, and 66 and 67 being pivotally forced apart at their apex corners. As these plates are interconnected at the trailer section axle 63, the result is a movement apart of the wheels 53 and 54 whereby the axle 63 is raised from its FIG. 4 position vertically upwardly to its FIG. 3 position. Thus, operation of each wheel unit hydraulic cylinder assembly results in an arcuate movement of each pair of plates about a wheel axle, and such arcuate movement effects a radial movement of the connection between the plates and the frame 43, namely, the axle 63. This radial movement of the axle 63 is also arcuately about each wheel axle. It is obvious that wheels 53 and 54 are thereby forced apart with a resultant raising of the axle 63 and the frame 43, whereby the entire trailer section 22 is vertically raised while in its horizontally disposed position to the transport position of FIGS. 1, 3, and 10. The handle 94 is then placed in the neutral position, and the safety yokes 82 are moved to their piston rod locking positions of FIG.

3 and FIG. 12. In summation, a truck has been described hereinbefore with a trailer section movable vertically relative to a cab section from an elevated transport position to a lowered, ground engaging loading position, and vice versa, by means of a novel combination of hydraulic cylinder assemblies and articulated wheel units.

Some changes may be made in the construction and arrangement of my truck having vertically movable trailer without departing from the real spirit and purpose of my invention, and it is my intention to cover by my claims, any modified forms of structure or use of mechanical equivalents which may be reasonably included within their scope.

I claim:
1. A load carrying truck comprising in combination:
a wheeled cab section having upright channel members at its rear;
a trailer section adapted to move vertically relative to said cab section, and having upright members at its front each of which extends contiguous with a channel member, said trailer section having further a plurality of rollers rotatably secured to each upright member and rollable within the contiguous channel member, and means for releasably locking said channel members and said upright members together;
a pair of wheel units mounted on each side of said trailer section;
means connected to each of said wheel units and operatively connected to said trailer section, said means movable arcuately relative to said trailer section; and
power means connected to said arcuately movable means and operable to move said arcuately movable means effecting thereby vertical movement of said trailer section relative to said wheel units and to said cab section.

2. A load carrying truck comprising in combination:
a wheeled cab section having upright channel members at its rear;
a trailer section adapted to move vertically relative to said cab section, and having upright members at its front each of which extends contiguous with a channel member, said trailer section having further a plurality of rollers rotatably secured to each upright member and rollable within the contiguous channel member, and means for releasably locking said channel members and said upright members together comprising a rotatable shaft connected at each end to said upright channel members, an arm rigidly secured at each end of said shaft, a stop member on each of said arms, a lug secured to each of said upright members on said trailer, means for pivoting said shaft to cause said stop members to lockingly engage said respective lugs;
means connected to said trailer section and extended laterally from each side thereof;
wheel units for said trailer section disposed on each side thereof;
means pivotally connecting each of said wheel units to said laterally extended means; and
power means operable to move said pivotally connected means in an arcuate manner relative to said trailer section, effecting thereby vertical movement of said pivotally connected means and said trailer section relative to said wheel units.

3. A load carrying truck comprising in combination:
a wheeled cab section having upright channel members at its rear;
a trailer section adapted to move vertically relative to said cab section, and having upright members at its front each of which extends contiguous with a channel member, said trailer section having further a plurality of rollers rotatably secured to each upright member and rollable within the contiguous channel member, and means for releasably locking said channel members and said upright members together comprising a rotatable shaft connected at each end to said upright channel members, an arm rigidly secured at each end of said shaft, a stop member on each of said arms, a lug secured to each of said upright members on said trailer, said stop members extending towards each other, means for pivoting said shaft to cause said stop members to lockingly engage the under side of said respective lugs;
and a hydraulic power means connected to said trailer for raising it and said upright members to a position for said stop members to lockingly engage said lug members respectively whereby the hydraulic means may be relaxed;
said trailer section having a transverse shaft connected thereto; a pair of wheel units mounted on each side of said trailer section; each wheel unit including a pair of longitudinally spaced wheels having axles, and a pair of plate units each of which is pivotally connected to said transverse shaft and extended longitudinally therefrom in opposite directions, one plate unit also pivotally connected to one wheel axle and the other plate unit pivotally connected to the other wheel axle; and
power means connected to both plate units and capable of causing relative movement therebetween, effecting thereby vertical movement of said transverse shaft and said trailer section relative to said wheels.

4. A load carrying truck comprising in combination:
a wheeled cab section;
a trailer section connected to said cab section and adapted to move vertically relative thereto, said trailer section having a transverse shaft extending from each side and connected thereto;
a pair of wheel units mounted on each side of said trailer section;
each wheel unit comprising a tandem pair of wheels located in a position straddling said shaft; a first member pivotally connected at one end to a wheel axle and at the other end to said shaft and a second member pivotally connected at one end to the other wheel axle and at the other end to said shaft, said first and second members extended from said shaft in opposite directions; and
power means including a fluid actuated piston and cylinder assembly, the piston of said assembly pivotally connected to one of said members and the cylinder of said assembly pivotally connected to the other of said members, said piston having a rod extending through the rear of said cylinder, a U-shaped yoke being pivotally connected to the rear of said cylinder and adapted to pivot to a position longitudinally aligned with said rod for limiting its outward movement, whereby operation of said assembly forces relative movement of said members about said shaft in an arcuate direction toward and away from each other, effecting thereby vertical movement of said shaft and said trailer section.

5. A load carrying truck comprising in combination:
a wheeled cab section having upright channel members at its rear;
a trailer section adapted to move vertically relative to said cab section, and having upright members at its front each of which extends contiguous with a channel member, said trailer section having further a plurality of rollers rotatably secured to each upright member and rollable within the contiguous channel member, and means for releasably locking said channel members and said upright members together;
a pair of wheel units mounted on each side of said trailer section;
said trailer section having a transverse shaft extending from each side and connected thereto;
each wheel unit comprising a tandem pair of wheels located in a position straddling said shaft; a first member pivotally connected at one end to a wheel axle and at the other end to said shaft, and a second member pivotally connected at one end to the other wheel axle and at the other end to said shaft, said first and second members extended from said shaft in opposite directions;

power means including a fluid actuated double acting piston and cyliner assembly with fluid capable of entering and leaving each cylinder at opposite ends simultaneously, the piston of said assembly pivotally connected to one of said members and the cylinder of said assembly pivotally connected to the other of said members, a fluid pump, a valve means connected to said pump, said valve means having a conduit connected to one end of one cylinder and a second conduit connected to the other end of said one cylinder, said second conduit having its other end connected to one end of the other cylinder, and a third conduit connected between the other end of the other cylinder and the valve means, said fluid being adapted to be pumped from said valve out through said first mentioned conduit and returned through said last mentioned conduit and at times be pumped out through said last mentioned conduit and returned through said first mentioned conduit, whereby operation of said assembly forces relative movement of said members about said shaft in an arcuate direction toward and away from each other, effecting thereby vertical movement of said shaft and said trailer section.

6. A load carrying truck comprising in combination:

a wheeled cab section having a pair of transversely spaced, parallel upright channel members;

a trailer section adapted to move vertically relative to said cab section and having a pair of transversely spaced, parallel upright members, a plurality of rollers each rotatably mounted on a horizontal axis for rotation within a vertical plane, said rollers inserted into said channel members for rolling engagement therewith and mounted on said upright members, said trailer section having a shaft mounted thereunder extending laterally outwardly of each side of said trailer section;

a fluid actuated piston and cylinder assembly operatively connected to and extended between said cab section and said trailer section and operable to move said upright members vertically relative to said channel members;

a pair of wheel units mounted on each side of said trailer section;

each wheel unit comprising a tandem pair of wheels located in a position straddling said shaft and each wheel rotatably supported upon a corresponding axle; a first member connected at one end to a corresponding first one of said axles and pivotally connected at its other end to said shaft; and a second member connected at one end to a corresponding one of said other axles and pivotally connected at its other end to said shaft; said first and second members extended from said shaft in opposite directions;

power means including a second and third fluid actuated piston and cylinder assemblies the piston of each of said second and third assemblies pivotally connected to corresponding one of said first members, and the cylinder of each of said assemblies pivotally connected to corresponding one of said second members, whereby operation of said assembly forces relative movement of said first and second members about said shaft in an arcuate direction toward and away from each other, effecting thereby vertical movement of said shaft and said trailer section relative to said wheels;

and manually actuated valve means operable to actuate said fluid actuated assembly and said fluid actuated piston and cylinder assembly simultaneously, a fluid pump connected to said valve means, a first conduit between said valve means and one end of one cylinder of one of said assemblies, a second conduit extending from the other end of said one cylinder to one end of a second cylinder of said assemblies, a third conduit extending from the other end of said second cylinder to one end of a third cylinder of said assemblies and a fourth conduit returning to said valve means from the other end of said third cylinder, said fluid being adapted to be pumped out from said valve through said first mentioned conduit and returned through said last mentioned conduit and at times pumped out through said last mentioned conduit and returned through said first mentioned conduit.

References Cited by the Examiner

UNITED STATES PATENTS

| | | | |
|---|---|---|---|
| 2,519,002 | 8/1950 | Stemen et al. | 280—43.16 |
| 2,560,715 | 7/1951 | Bill | 280—43.23 X |
| 2,774,604 | 12/1956 | Rendel et al. | 280—43.23 X |
| 2,893,747 | 7/1959 | Hamblin | 280—43.23 |
| 2,957,593 | 10/1960 | Evans | 214—506 |

BENJAMIN HERSH, *Primary Examiner.*

PHILIP ARNOLD, A. HARRY LEVY, *Examiners.*